(12) United States Patent
Häberle

(10) Patent No.: US 6,365,043 B1
(45) Date of Patent: Apr. 2, 2002

(54) FILTER PLATE FOR A FILTER PRESS

(75) Inventor: Hans Häberle, Neu-Ulm/Holzschwang (DE)

(73) Assignee: Lenser Filtration GmbH + Co., Senden (DE)

( * ) Notice: Subject to any disclaimer, the term of this patent is extended or adjusted under 35 U.S.C. 154(b) by 0 days.

(21) Appl. No.: 09/658,475

(22) Filed: Sep. 8, 2000

(30) Foreign Application Priority Data

Sep. 13, 1999 (DE) .......................................... 199 43 584

(51) Int. Cl.[7] .............................................. B01D 25/12
(52) U.S. Cl. ...................................................... 210/231
(58) Field of Search ................................ 210/224–231

(56) References Cited

U.S. PATENT DOCUMENTS 4,931,178 A * 6/1990 Manniso et al. ............ 210/231

* cited by examiner

Primary Examiner—Robert J. Popovics
(74) Attorney, Agent, or Firm—Collard & Roe, P.C.

(57) ABSTRACT

The invention relates to a filter press having a plurality of filter plates forming filter chambers between each other. A pressing diaphragm is supported on the filter plates. The pressing diaphragm is provided with an edge strip that extends all around. The edge strip is welded to a support wall of the filter plate, whereby the edge strip, on its side facing away from the support wall, is provided with transversely extending cutouts. Provision is made between the edge strip and the plate frame for a filtrate channel into which filtrate drain ducts feed, these ducts lead to a filtrate outlet.

6 Claims, 6 Drawing Sheets

FILTER PLATE FOR A FILTER PRESS

BACKGROUND OF THE INVENTION

1. Field of the Invention

The invention relates to a filter plate for a filter press on which a plurality of filter plates form filter chambers between each other and each support on one or on both of their sides a pressing diaphragm.

2. The Prior Art

Filter plates are known in a variety of designs, different techniques are employed for securing the pressing a diaphragm on the support wall. If the filter plate has a pressing diaphragm on both sides, another plate (for example a chamber plate), is usually arranged between the two filter plates.

SUMMARY OF THE INVENTION

The invention is based on the problem of improving these filter plates in such a way that the manufacturing process is simplified.

This problem is solved according to the invention in that the pressing diaphragm is provided with an edge strip that extends all around. The edge strip is welded to the support wall of the filter plate, whereby the edge strip, on its side facing away from the support wall, is provided with transversely extending cutouts. Provision is made between the edge strip and the plate frame for a filtrate channel into which filtrate drain ducts feed, these ducts lead to the filtrate outlet.

An advantage of this invention is that the pressing diaphragm can be uniformly manufactured in one single production step since the dimensions of the edge strip substantially correspond with the profiled projections, therefore pre-fabrication of the edge strip is omitted. The pressing diaphragm is molded directly, for example from granulate material. Since the filtrate channel is arranged outside of the pressing diaphragm, there is no risk that damage will occur to the diaphragm when the filtrate channel is milled for removing the welding flash, or when the filtrate drain channels are drilled. The manufacture of the filter plate is therefore reduced to prefabrication of the support wall with the plate frame, which is usually carried out by pressing or machining. The pressing diaphragm can be produced in one manufacturing step from granulate, so that the pressing diaphragm subsequently only needs to be welded to the support wall. The filtrate channel is produced automatically in accordance with the measurements selected for the pressing diaphragm.

Furthermore, an advantage of the present invention is that the filtrate channel can be provided with an adequate depth because the filter cloth will not get lodged in the filtrate channel, thereby obstructing the off-flow of the filtrate.

According to a preferred embodiment of the invention, the height of the edge strip substantially equals the height of the profiled projections on the edge strip. However, the height of the projections can be slightly greater.

In a first embodiment of the invention, the top sides of the edge strip and the plate frame are disposed in one common plane. Furthermore, the filtrate drain ducts are in the form of bores feeding into the bottom of the filtrate channel.

However, it is also possible that the top side of the edge strip extends offset in the direction of the support wall relative to the top side of the plate frame. The filtrate drain ducts feed into cutouts disposed in the edge strip.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
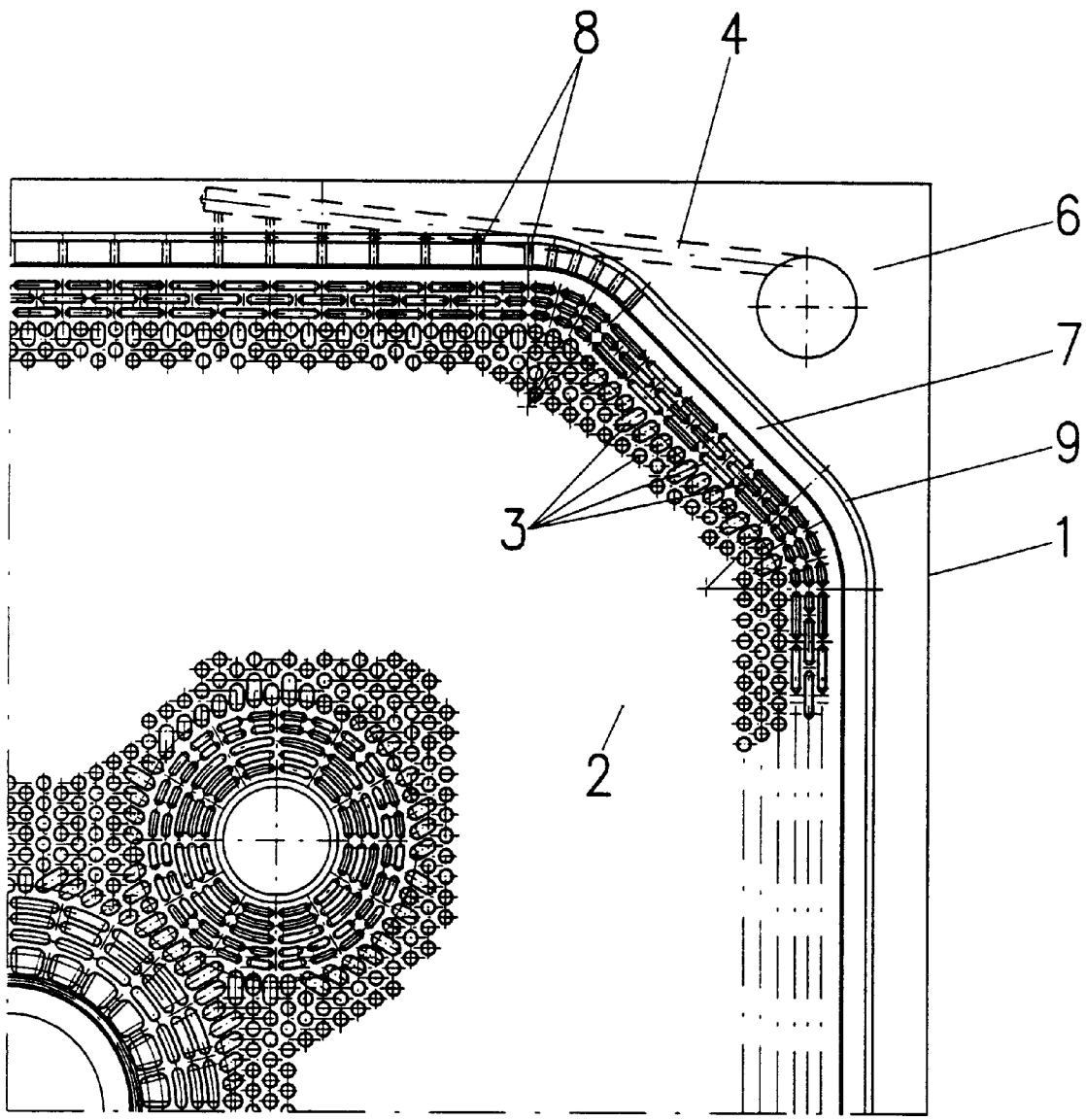
FIG. 1 shows a top view of a cutout, specifically of a quadrant of a filter plate according to the invention.

Referring now in detail to the drawings and, in particular, FIG. 1 there is shown filter plate 1, which is only partly shown in the drawing, is intended for a filter press where a plurality of filter plates 1 are clamped together and sealed against each other on the edge sides. Filter plates 1 form filter chambers between each other not shown in detail in the drawing. Each filter plate 1 supports a pressing diaphragm 2 on one or both of its sides. Diaphragm 2 is movable forward when acted upon by a pressure medium. Following the filtration phase, pressing diaphragm 2 makes it possible to after-press the filter cake that builds up in the filter chamber, to achieve higher dehumidification of the filter cake.

On the chamber side, pressing diaphragms 2 have on their surfaces profiled projections 3, which are covered with a filter cloth (not shown). Profiled projections 3 form a duct system for the filtrate, said system of ducts being connected with a filtrate outlet 4.

Filter plate 1 is formed by a rigid support wall 5, which has a rigid plate frame 6 that is formed as one piece jointly with support wall 5. Support wall 5 with plate frame 6 can be manufactured by machining steps or also by a molding process, using thermoplastic material.

Pressing diaphragm 2 is provided with an edge strip 7 extending all around the diaphragm. Edge strip 7 is welded to support wall 5. On its side facing away from support wall 5, edge strip 7 has transversely extending cutouts 8, which are connected with the filter chamber, and with a filtrate channel 9. Provision is made for filtrate channel 9 between edge strip 7 and plate frame 6 projecting beyond the plane of support wall 5. Filtrate drain ducts 10 leading to filtrate outlet 4 feed into filtrate channel 9.

The height of edge strip 7 substantially corresponds with the height of profiled projections 3 bordering on edge strips 7. Edge strip 7 may also have a slightly greater height as shown in FIGS. 3 and 6.

Figure 2:
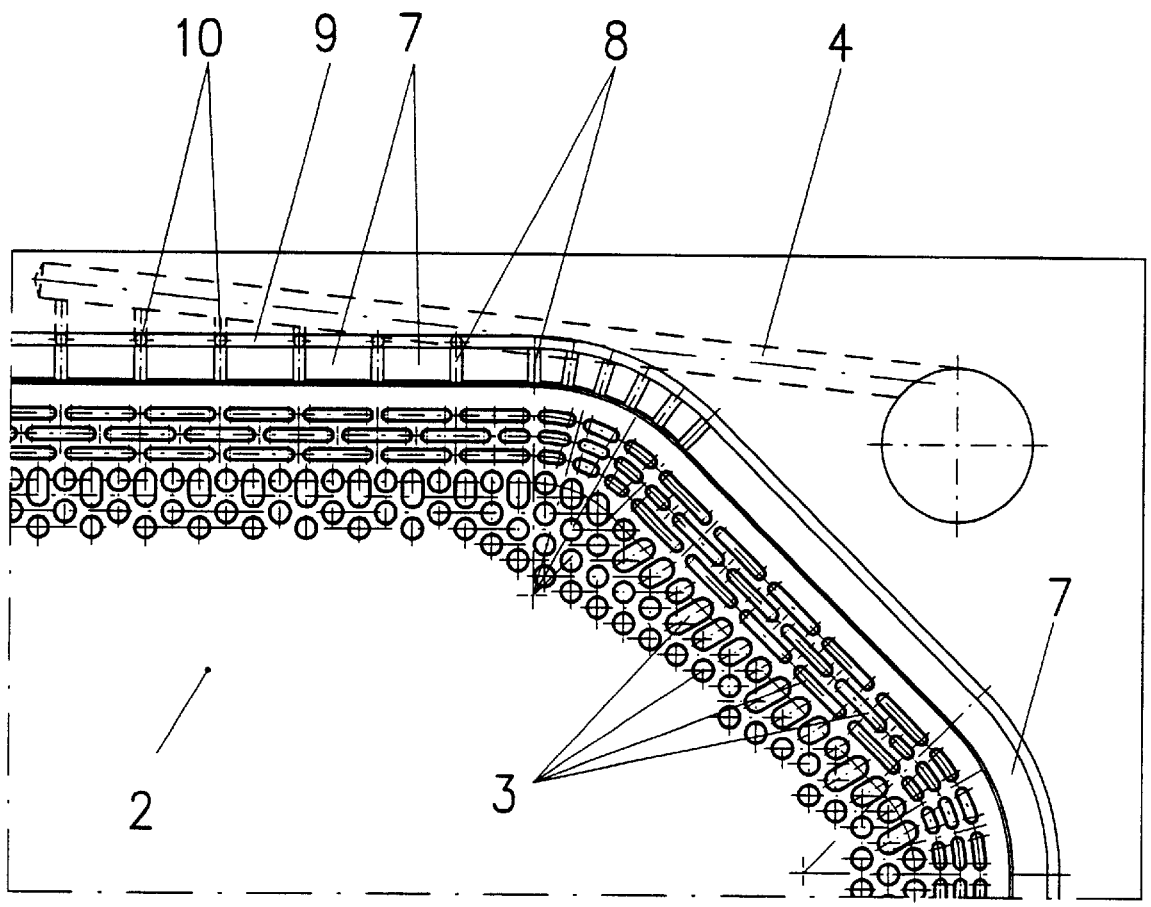
FIG. 2 shows a detailed view of the object according to FIG. 1.
Figure 3:
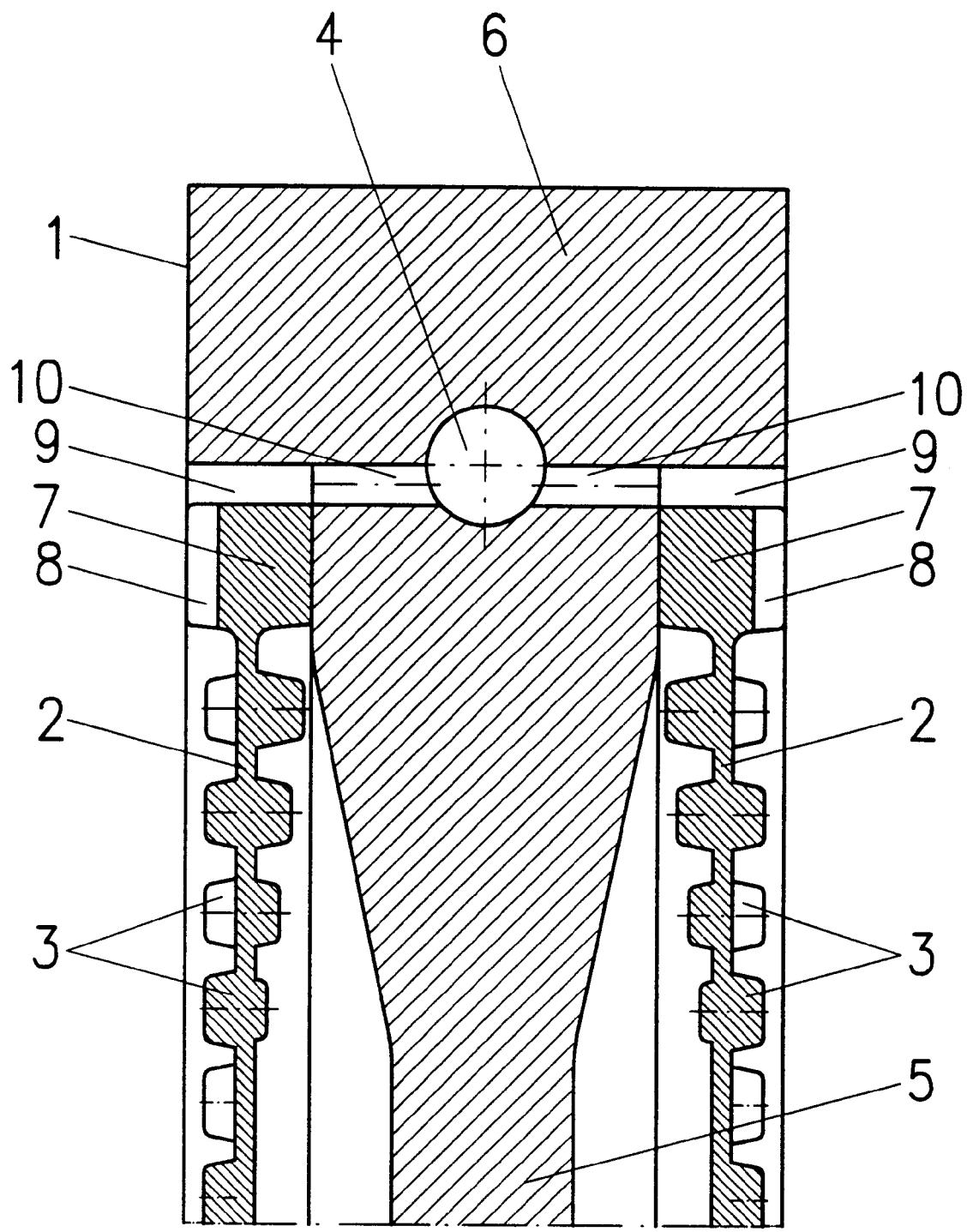
FIG. 3 shows a cross section through the filter plate in its edge zone.

In a first embodiment, which is shown in FIGS. 1 to 3, the top sides of edge strip 7 and plate frame 6 are disposed in one common plane. Filtrate drain ducts 10 are in the form of bores that feed into the bottom of filtrate channel 9.

Figure 4:
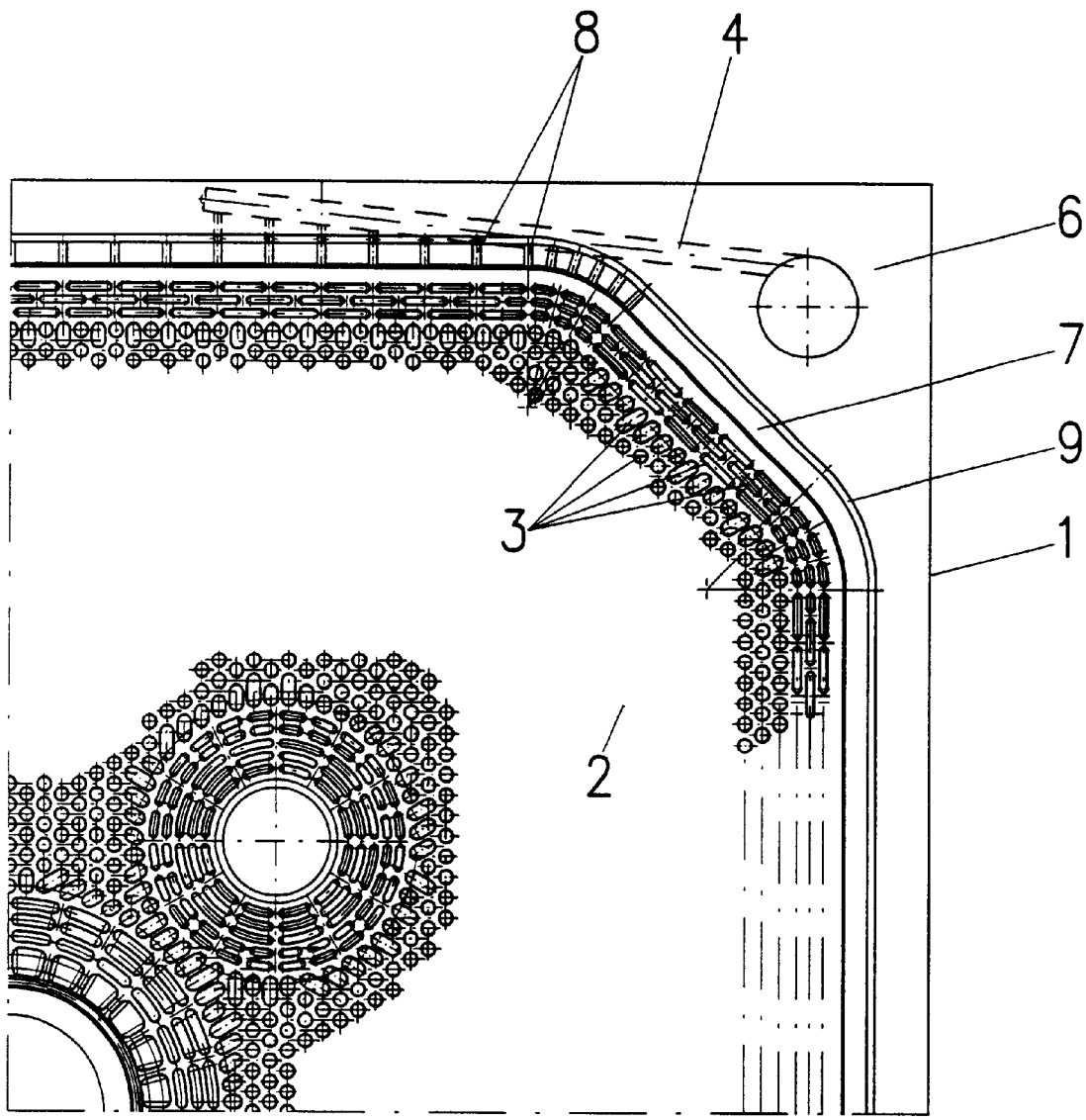
FIG. 4 shows a second embodiment according to the invention.
Figure 5:
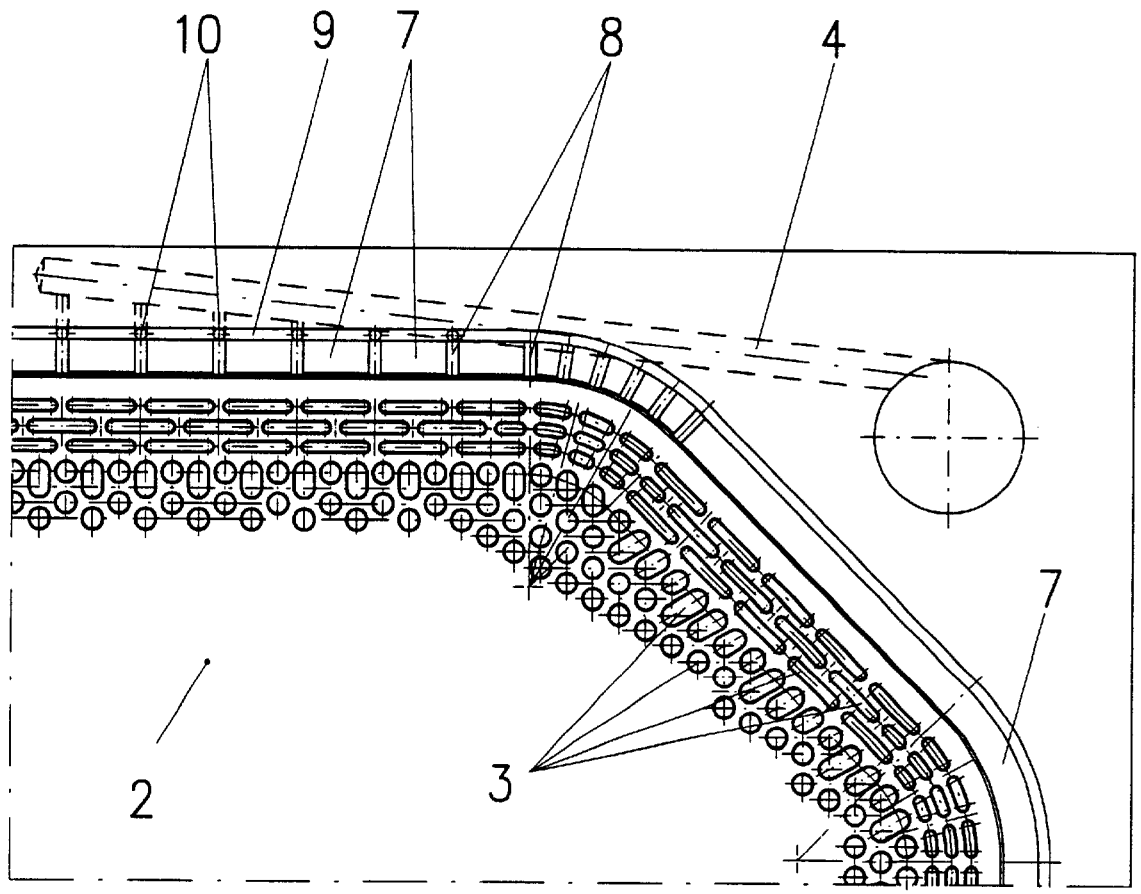
FIG. 5 shows a detailed view of FIG. 4.
Figure 6:
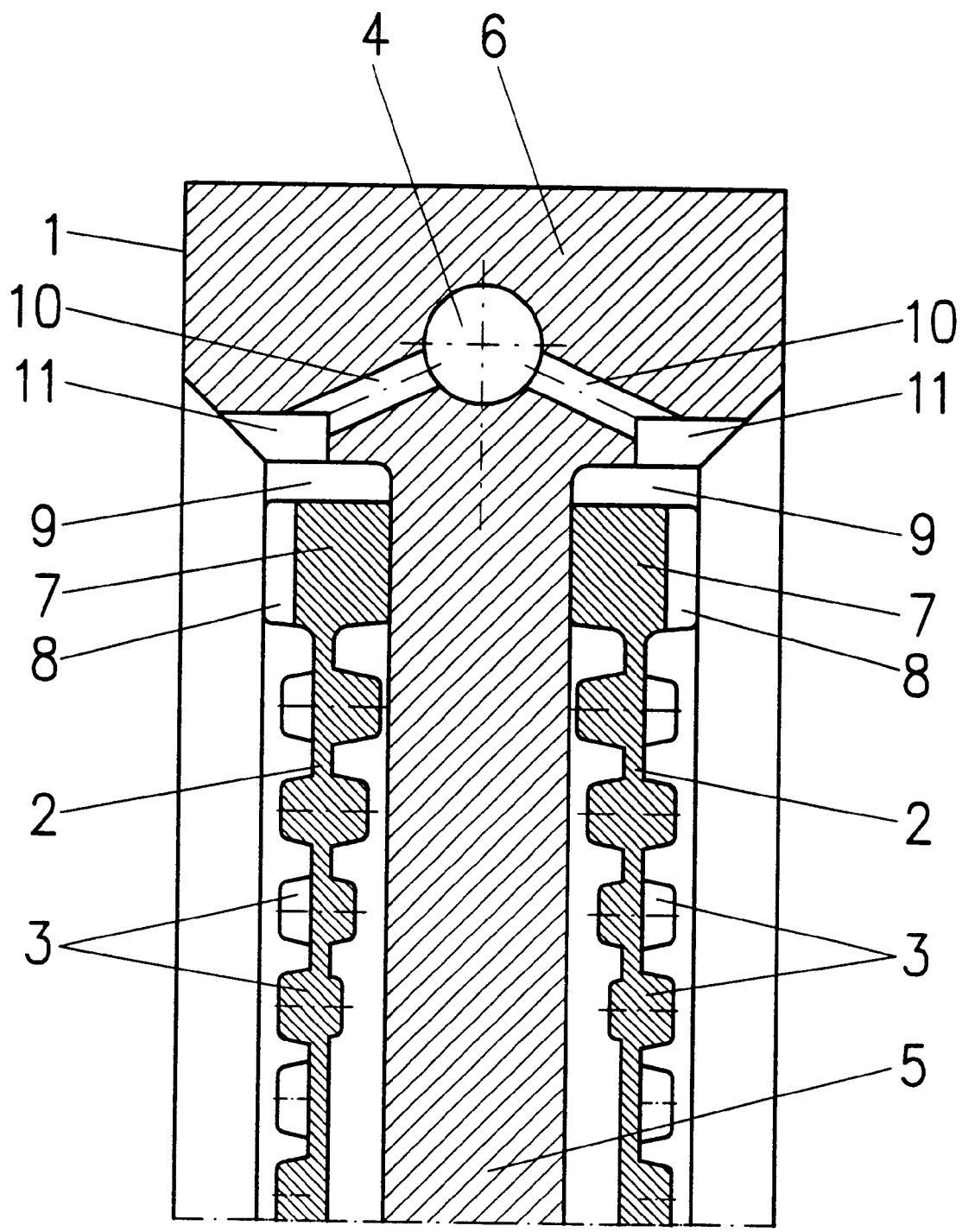
FIG. 6 shows a cross section of FIG. 3, with a cut through the edge zone.

In the embodiment according to FIGS. 4 to 6, plate frame 6 is thicker, so that the top side of edge strip 7 extends offset relative to the top side of plate frame 6 in the direction of support wall 5. In the present embodiment, filtrate drain ducts 10 feed into cutouts 11, for which provision is made in the wall of filtrate channel 9 on the side facing away from edge strip 7.

Accordingly, while only a few embodiments of the present invention have been shown and described, it is obvious that many changes and modifications may be made thereunto without departing from the spirit and scope of the invention.

What is claimed is:

1. A filter for a filter press for receiving a filtrate comprising:
    a plurality of filter plates (1) sealingly clamped together forming a filter chamber therebetween, each filter plate comprising:
        a support wall (5); and
        a plate frame (6) having a top side and integrally formed with said support wall (5) so as to be molded as one piece;
    a pressing diaphragm (2) supported on each of said filter plates (1), facing away from said filter chamber, said pressing diaphragm (2) comprising:
        an edge strip (7) disposed circumferentially around said diaphragm (2), having a top side and a bottom side, said edge strip comprises transversely extending cut-outs (8) on said top side, said cut-outs (8) connecting to said filter chamber, and wherein said bottom side of said edge strip is welded to said support wall (5); and
        profiled projections (3) disposed on said diaphragm (2) surface forming a system of ducts (10) for the filtrate;
        a filtrate channel (9) formed between said edge strip (7) and said plate frame (6) extending beyond said support wall (5); and
        a filtrate outlet (4) connected to said system of ducts (10) feeding into to said filtrate channel (9).

2. The filter plate according to claim 1, wherein the height of said edge strip (7) is substantially equal to the height of said profiled projections (3).

3. The filter plate according to claim 1, wherein said top side of said edge strip (7) and the top side plate frame (6) are disposed in a common plane.

4. The filter plate according to claim 3, wherein said duct system (10) comprises bores feeding into the bottom of said filtrate channel (9).

5. The filter plate according to claim 1, further comprising cut-outs (11) disposed on said filtrate channel (9) on a side facing away from said edge strip (7).

6. The filter plate according to claim 1, wherein said top side of said edge strip (7) extends offset relative to said top side of said plate frame (6) in the direction of said support wall (5), whereby said duct system (10) feeds into said cut-outs (11).

* * * * *